US010795422B2

(12) United States Patent
Sachs et al.

(10) Patent No.: US 10,795,422 B2
(45) Date of Patent: Oct. 6, 2020

(54) METHOD AND APPARATUS FOR MISSION CRITICAL STANDBY OF A PORTABLE COMMUNICATION DRIVE

(71) Applicant: Motorola Solutions, Inc., Chicago, IL (US)

(72) Inventors: Daniel Grobe Sachs, Elmhurst, IL (US); Graeme Johnson, Plantation, FL (US); Stephen C. Glass, Plantation, FL (US); Peter J. Bartels, Loxahatchee, FL (US); Javier Alfaro, Miami, FL (US); Carlos Camps, Ft Lauderdale, FL (US)

(73) Assignee: Motorola Solutions, Inc., Chicago, IL (US)

( * ) Notice: Subject to any disclaimer, the term of this patent is extended or adjusted under 35 U.S.C. 154(b) by 168 days.

(21) Appl. No.: 16/044,271

(22) Filed: Jul. 24, 2018

(65) Prior Publication Data
US 2020/0033932 A1   Jan. 30, 2020

(51) Int. Cl.
| *G06F 1/3206* | (2019.01) |
| *G06F 1/28* | (2006.01) |
| *H04W 52/02* | (2009.01) |
| *H04W 4/10* | (2009.01) |

(52) U.S. Cl.
CPC .............. *G06F 1/3206* (2013.01); *G06F 1/28* (2013.01); *H04W 52/0274* (2013.01); *H04W 4/10* (2013.01)

(58) Field of Classification Search
CPC ..... G06F 1/3206; G06F 1/28; H04W 52/0274
USPC .......................................... 710/300; 713/300
See application file for complete search history.

(56) References Cited

U.S. PATENT DOCUMENTS

| 5,390,350 | A | * | 2/1995 | Chung | .................. G06F 1/3203 713/322 |
| 5,446,904 | A | * | 8/1995 | Belt | ........................ G06F 1/24 713/323 |
| 5,627,962 | A | | 5/1997 | Goodrum et al. | |
| 5,752,044 | A | | 5/1998 | Crump et al. | |
| 6,496,881 | B1 | * | 12/2002 | Green | ...................... G06F 1/24 710/58 |

(Continued)

OTHER PUBLICATIONS

Partial Search Report for PCT Patent Application No. PCT/US20119/042336, dated Aug. 30, 2019; 11 pages.

*Primary Examiner* — Paul R. Myers
(74) *Attorney, Agent, or Firm* — Baker Botts L.L.P.

(57) ABSTRACT

A method and apparatus for mission critical standby of a portable communication device are disclosed. A portable communication device may include a primary processor for a first operating platform, a secondary processor for a second operating platform and communicatively coupled to the primary processor, and a power state manager that may have a first mode and a second mode. The power state manager may be configured to determine whether the primary processor is in a powered off state and sequence supply of power to the secondary processor. The first mode may allow the primary processor to monitor a power state of the secondary processor based on a determination that the primary processor is not in the powered off state and the second mode may enable the power state manager to monitor the power state based on a determination that the primary processor is in the powered off state.

12 Claims, 6 Drawing Sheets

(56) References Cited

U.S. PATENT DOCUMENTS

| | | | |
|---|---|---|---|
| 6,958,705 B2* | 10/2005 | Lebel | A61N 1/37211 340/870.07 |
| 7,747,886 B1 | 6/2010 | Bridgwater et al. | |
| 7,844,838 B2* | 11/2010 | Naffziger | G06F 1/3203 713/300 |
| 8,291,250 B2 | 10/2012 | Bridgwater et al. | |
| 10,015,658 B1 | 7/2018 | Alfaro et al. | |
| 10,141,791 B2* | 11/2018 | Bell | H02J 50/00 |
| 2002/0138772 A1* | 9/2002 | Crawford | G06F 1/30 713/300 |
| 2003/0225875 A1* | 12/2003 | Revanuru | G06F 9/445 709/223 |
| 2005/0289371 A1* | 12/2005 | Makiyama | G06F 1/3203 713/300 |
| 2008/0104428 A1* | 5/2008 | Naffziger | G06F 1/324 713/300 |
| 2008/0244227 A1* | 10/2008 | Gee | G06F 9/5088 712/30 |
| 2009/0313492 A1* | 12/2009 | Lerman | G06F 1/3293 713/323 |
| 2010/0100696 A1* | 4/2010 | Suzuki | G06F 3/0647 711/162 |
| 2014/0018125 A1 | 1/2014 | Shoshan et al. | |
| 2014/0304711 A1 | 10/2014 | Tennant et al. | |
| 2014/0344605 A1* | 11/2014 | Xie | G06F 1/3293 713/324 |
| 2019/0041951 A1* | 2/2019 | Shapira | G06F 1/3296 |
| 2019/0346905 A1* | 11/2019 | Song | G06F 1/1632 |

\* cited by examiner

METHOD AND APPARATUS FOR MISSION CRITICAL STANDBY OF A PORTABLE COMMUNICATION DRIVE

BACKGROUND OF THE INVENTION

Many portable communication devices, such as two-way radios, are utilized to perform different types of communication. These types of communication, which may occur separately or in parallel, include standing wave radio transmission, land mobile radio (LMR) transmission, and long-term evolution (LTE) transmission. Portable communication devices may be battery-powered and may include multiple components, including a transceiver and one or more processors, for mission critical operations.

Without power management, one or more components of the portable communication may remain in an active state, draw excessive power, and cause excessive discharge of the battery. One or more processors in present portable communication devices may manage the power of the components when powered on. However, there are situations in which it may not be feasible for the processors to manage power consumption when powered off. When one or more processors are turned off, present portable communication devices do not control excessive discharge of the battery.

There exists a limitation with respect to managing the discharge of the battery when one or more processors of the portable communication devices for mission critical operations are turned off. This functionality typically may not be achieved by simply keeping the processors powered on.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
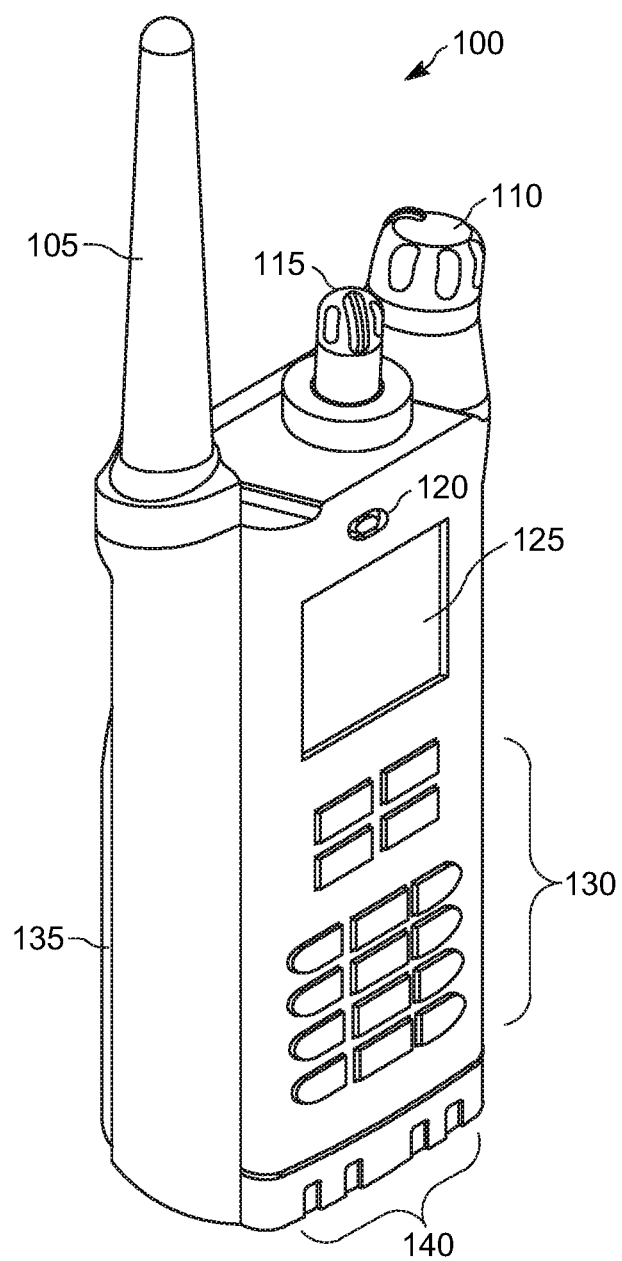
FIG. 1 is a perspective view of an example portable communication device, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The system, method, and apparatus components have been represented where appropriate by suitable symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are systems, methods, and apparatuses for mission critical standby of a portable communication device.

In one embodiment, a disclosed portable communication device includes a primary processor, secondary processor communicatively coupled to the primary processor, and a power state manager. The primary processor may be for a first operating platform and the secondary processor may be for a second operating platform. The power state manager may be configured to determine whether the primary processor is in a powered off state and sequence supply of power to the secondary processor. The power state manager may have a first mode and a second mode. The first mode may allow the primary processor to monitor the power state of the secondary processor based on a determination that the primary processor is not in the powered off state. The second mode may enable the power state manager to monitor the power state of the secondary processor based on a determination that the primary processor is in the powered off state.

In one embodiment, a disclosed method for sequencing power of a portable communication device having a primary processor and a secondary processor includes receiving a first command in response to user input, starting a first timer to limit time spent by the secondary processor in a standby mode, sending a second command to the secondary processor to initiate cleanup operation, determining whether the first timer expired, and sending a third command to the secondary processor to shut down. The primary processor may be for a first operating platform and the secondary processor may be for a second operating platform. The first command may be to shut down the primary processor and the first timer may be started in response to receiving the first command. The cleanup operation to be initiated by the second command may be completed prior to shut down of the secondary processor. The third command may be sent based on a determination that the first timer expired, which may be determined relative to a first timeout value.

In at least some embodiments of the present disclosure, the systems, methods, and apparatuses as described herein for mission critical standby may support a plurality of processors in which at least one of the processors is dedicated to processing mission critical communications. Unlike apparatuses that employ one processor with one or more processing cores for processing communications, the methods and apparatus as described herein may support mission critical communications without reducing battery life by supporting low power modes for the plurality of processors, including any processor(s) for supporting mission critical communications, and without the need to wait for a consumer level operating system to boot on any processor(s) for supporting mission critical communications.

In at least some embodiments of the present disclosure, the systems, methods, and apparatuses as described herein for mission critical standby may permit monitoring of a secondary processor to be performed by a plurality of components. Unlike apparatuses that employ monitoring of a secondary processor by one component, the methods and apparatus as described herein may support mission critical communications by allowing a primary processor to monitor the secondary processor when the primary processor is powered on and by enabling a power state manager to monitor the secondary processor when the primary processor is powered off.

In at least some embodiments of the present disclosure, the systems, methods, and apparatuses as described herein for mission critical standby may supervise unexpected wakeup events by a secondary processor. Unlike apparatuses that employ consumer level operating systems to manage power states, the methods and apparatus as described herein may support mission critical communications by permitting cleanup operations on a secondary processor for a limited period of time before returning the secondary processor to standby or initiating shutdown of the secondary processor.

In at least some embodiments of the present disclosure, the systems, methods, and apparatuses as described herein for mission critical standby may force a hard shutdown of the secondary processor. Unlike apparatuses that employ consumer level operating systems to manage power states, the methods and apparatus as described herein may support mission critical communications by forcing a hard shutdown of the secondary processor when the secondary processor does not properly execute one or more shutdown commands.

Referring now to FIG. 1, there is provided a perspective view of an example portable communication device 100 with support for mission critical standby in accordance with some embodiments. In various embodiments, portable communication device 100 may include antenna 105 for the transmission and reception of communication signal(s). Antenna 105 may communicate using one or more communication standards including, but not limited to, radio communication and wireless communication. Portable communication device 100 may further include battery 135. Battery 135 may be embedded in portable communication device 100 (not shown) or may be removable from portable communication device 100. Battery 135 may be charged via one or more terminals 140. Battery may provide power for one or more components of portable communication device 100, including but not limited to communications.

In various embodiments, portable communication device 100 may include one or more input devices. In some embodiments, a plurality of front-facing buttons 130 may be used to input information to portable communication device 100. In various embodiments, one or more microphones 120 may be used to receive audio input to portable communication device 100. In some embodiments, primary display 125 of portable communication device 100 may include a touch input interface to control portable communication device 100. In some embodiments, portable communication device 100 may include one or more knobs (110 and 115). Knob 110 may be used to adjust communications. For example, knob 110 may adjust the state of the radio between on and off. As another example, knob 110 may adjust the volume of the audio output from portable communication device 100 such that the radio is turned off when knob 110 is adjusted beyond a minimum volume setting. Knob 115 may be used to adjust the communication channel used by portable communication device 100.

Figure 2:
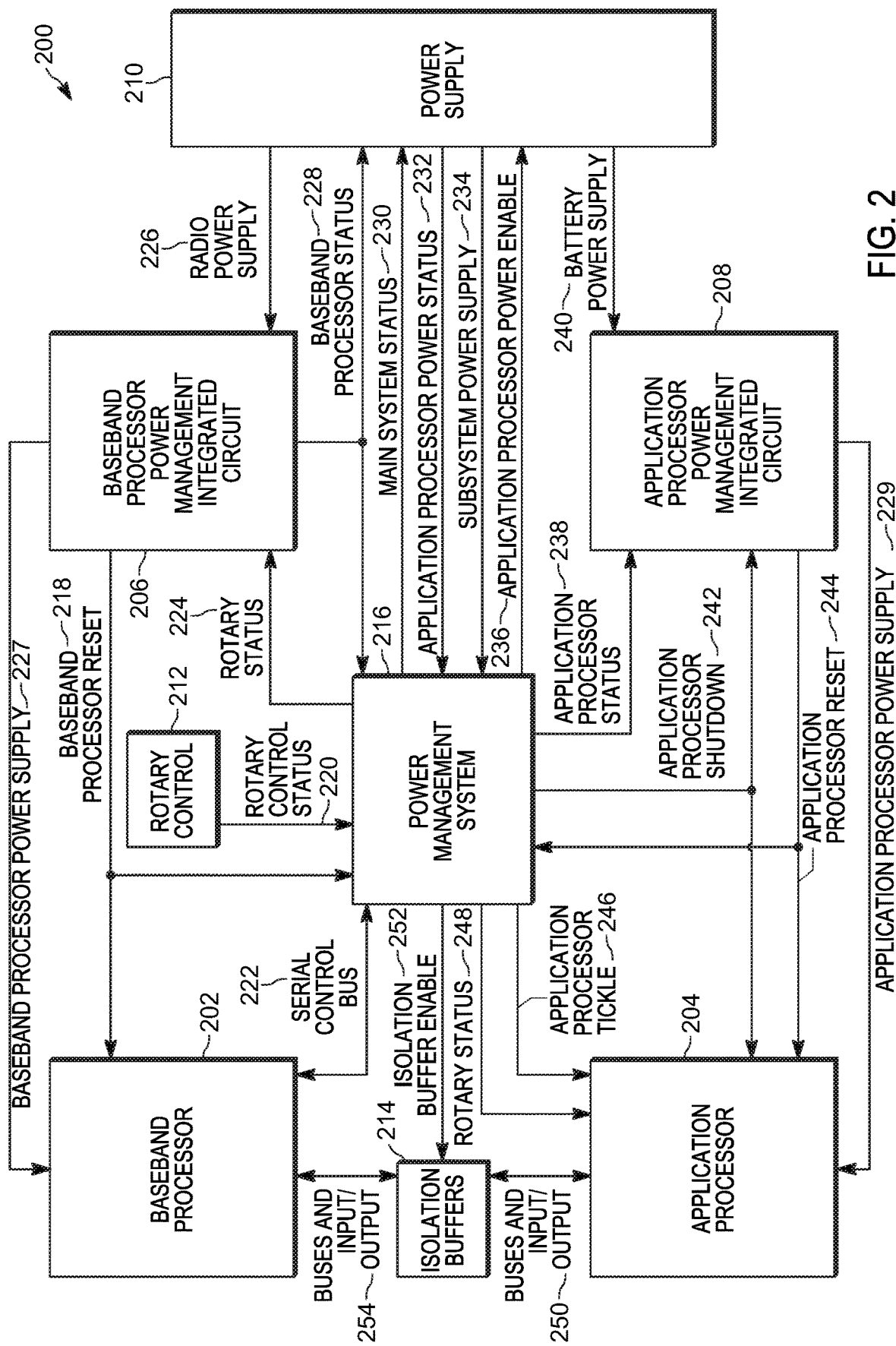
FIG. 2 is a block diagram illustrating an example portable communication device supporting mission critical standby, in accordance with some embodiments.

Referring now to FIG. 2, there is provided a block diagram illustrating an example portable communication device 200 supporting mission critical standby. Portable communication device 200 may include a primary processor, such as baseband processor (BP) 202, a secondary processor, such as application processor (AP) 204, power management subsystem 216, and rotary control 212. BP 202 may support communications for mission critical operations, including but not limited to, one or more communications over high-powered land mobile radio (LMR), public safety long-term evolution (PS LTE), and mission critical push-to-talk over long-term evolution (MSPTT over LTE). A real-time operating system (RTOS) may execute on BP 202 to provide for mission critical communications without indeterminant delays in processing incoming or outgoing communications. AP 204 may support one or more communications, including but not limited to, geofencing using a global positioning system (GPS), broadband and wireless local area networking (e.g., Wi-Fi), Bluetooth audio, and consumer long-term evolution (LTE). In some embodiments, one or more accessories may be supported by AP 204, including but not limited to, a wireless earpiece, a wired headset, or any suitable accessory communicatively coupled to AP 204. A consumer-level operating system (OS) may execute on AP 204 to provide for one or more communications with indeterminant delays in processing incoming or outgoing communications. For example, the consumer-level OS may be implemented based on Android™. Skilled artisans will appreciate that, in some embodiments, the consumer-level OS may be implemented based on open source operating systems, such as Tizen.

Rotary control 212, which may be referred to as a rotary knob, may control the power state of BP 202 and the monitoring of AP 204. For example, rotary control 212 may be implemented as knob 110 as described for FIG. 1. Rotary control 212 may toggle the radio of portable communication device 200 on and off as the control is rotated. When rotary control 212 is switched on, BP 202 may be powered on and may monitor AP 204, and when rotary control 212 is switched off, BP 202 may be powered off and power management subsystem 216 may monitor AP 204. Rotary control 212 may provide user input via rotary control status 220 to power management subsystem 216. Based on rotary control status 220, power management subsystem 216 may provide rotary status 224 to baseband processor power management integrated circuit (BP PMIC) 206 and rotary status 248 to AP 204. In some embodiments, when rotary control 212 is switched off, power management subsystem 216 may request AP 204 to shut down by indicating to AP 204 via rotary status 248 that rotary control 212 is switched on. In response to rotary status 224, BP PMIC 206 may control the power state of BP 202 via one or more outputs, including but not limited to, baseband processor status (BP status) 228 and baseband processor reset (BP reset) 218. BP PMIC 206 may provide power to BP 202 via baseband processor power supply (BP power supply) 227. In response to rotary status 248, AP 204 may reset and then restart or reboot substantially in parallel with BP 202. For example, when rotary status 224 indicates rotary control 212 is set to on, BP PMIC 206 may assert BP reset 218 before BP PMIC 206 is powered down. BP status 228 may indicate the power state of BP 202 to power management subsystem 216 and power supply 210. For example, when BP status 228 is asserted, BP 202 may be in the powered-on state and BP power supply 227 may supply power to BP 202. When BP status 228 is de-asserted, BP 202 may be in the powered-off state and BP power supply may not supply power to BP 202. Skilled artisans will appreciate that in some embodiments, BP status 228 may indicate more than two states, such as a powered-on state, a low-power state, and a powered-off state.

When BP 202 is in the powered-on state, BP 202 may monitor AP 204 over buses and input/output 254, which may be coupled to isolation buffers 214. BP 202 may communicate with power management subsystem 216 via serial control bus 222 to indicate when AP 204 is being monitored by BP 202. Serial control bus 222 may be implemented using any suitable protocol, including but not limited to I²c and serial peripheral interface (SPI). When BP 202 is powered on, power management subsystem 216 may assert isolation buffer enable 252 to enable isolation buffers 214 to adjust or buffer the voltage level of a signal from BP 202 before sending the signal to AP 204 over buses and input/output 250. BP 202 may monitor AP 204 to determine the power state of AP 204.

When BP 202 is in the powered-off state, power management subsystem 216 may monitor AP 204 and determine the power state of AP 204. In some embodiments, power management subsystem 216 may monitor the voltage of one or more power supplies corresponding to AP 204 to determine the power state of AP 204. Power management subsystem 216 may receive an indication whether one or more power supplies corresponding to AP 204 have been set to memory retention mode via AP power status 232 from power supply 210. AP power status 232 may provide information indicative of the supply of power to the memory of AP 204. In some embodiments, AP power status 232 may represent the comparison between a measured core power supply voltage and a threshold. When the measured core power supply voltage is above the threshold at which processing may occur, AP 204 may be in an active or cleanup state, and when the measured core power supply voltage is below the threshold, AP 204 may not be capable of operation and may be in a non-active state, such as a standby state. Skilled artisans will appreciate that in some embodiments, power management subsystem 216 may compare application processor (AP) power status 232 that may represent the measured core power supply voltage to a threshold. When the measured core power supply voltage is indicative of AP 204 being in a non-active state, memory associated with AP 204 may be placed in a self-refresh state to retain data without sending information to or receiving information from AP 204.

Skilled artisans will appreciate that other forms of monitoring may be implemented, including but not limited to, monitoring an indication from application processor power management integrated circuit (AP PMIC) 208, monitoring the state of a clock generator for AP 204, or monitoring a timer or waiting on an interrupt corresponding to activity on AP 204. For example, AP 204 may include a watchdog timer that is reset via application processor (AP) tickle 246 each time power management subsystem 216 determines that AP 204 is powered on. When the watchdog timer is not reset, power management subsystem 216 may provide one or more outputs to initiate shutdown of AP 204. For example, power management subsystem 216 may provide application processor status (AP status) 238 to AP PMIC 208. AP status 238 may indicate the power state of AP 204 to AP PMIC 208, which may assert application processor reset (AP reset) 244 to reset or reboot AP 204 after AP 204 is powered on or may power down AP 204 by removing power supplied to AP 204 via application processor power supply (AP power supply) 229. As another example, power management subsystem 216 may initiate shutdown of AP 204 by asserting or pulsing application processor (AP) shutdown 242, which may be received by AP PMIC 208 and AP 204. In some embodiments, power management subsystem 216 may have access to the same information about AP 204 as BP 202 and may be able to monitor AP 204 without the need to synchronize information with BP 202.

In FIG. 2, power supply 210 may draw power from a power source. For example, the power source may be battery 135 as described for FIG. 1. Power supply 210 may convert energy from the power source. In some embodiments, power supply 210 may include a plurality of components (not shown) to convert energy from the power source. The converted energy may be provided by power supply 210 to one or more components of portable communication device 200, including but not limited to, BP 202, BP PMIC 206, power management subsystem 216, AP 204, and AP PMIC 208. Skilled artisans will appreciate that in some embodiments, the energy provided by power supply 210 may include one or more voltage supplies for use by one or more components of portable communication device 200. Power supply 210 may include logic to process power state information received from one or more components of portable communication device 200, including but not limited to, BP PMIC 206 and power management subsystem 216.

Power supply 210 may receive power state information from one or more components of portable communication device 200, including but not limited to, main system status 230, BP status 228, and application processor (AP) power enable 236. Main system status 250 may indicate whether portable communication device 200 is powered on. Power supply 210 may provide subsystem power supply 234 to power management subsystem 216 before power management subsystem 216 indicates via main system status 230 that portable communication device 200 is powered on. BP status 228 may indicate whether BP 202 is powered on. When BP status 228 indicates that BP 202 is powered on, power supply 210 may provide radio power supply 226 to BP PMIC 206. AP power enable 236 may indicate whether AP 204 is powered on. In various embodiments, AP 204 may be powered on by one or more power supplies, such as AP power supply 229. In some embodiments, power supply 210 may provide battery power supply 240 to AP PMIC 208, which may provide power to AP 204 via AP power supply 229 and indicate that AP 204 is powered on via AP power enable 236. Skilled artisans will appreciate that power conversion in portable communication device 200 may be implemented using a plurality of power supplies. For example, subsystem power supply 234 may be implemented as two power supplies, such as 1.8-volt and 3-volt power supplies.

In various embodiments, one or processors, such as BP 202 and AP 204, may include a microprocessor, a microcontroller, a system-on-a-chip, a field-programmable gate array, a programmable mixed-signal array, or, in general, any system or sub-system that includes nominal memory and that is capable of executing a sequence of instructions to control hardware. In various embodiments, each processor may be coupled to a memory or a plurality of processors may share a memory. The memory may include read only memory (ROM), random access memory (RAM), static random access memory (SRAM), and dynamic random access memory (DRAM). In various embodiments, power management subsystem 216 may be implemented as an integrated circuit or using a field programmable gate array (FPGA), or complex programmable logic device (CPLD) for monitoring AP 204.

Figure 3A:
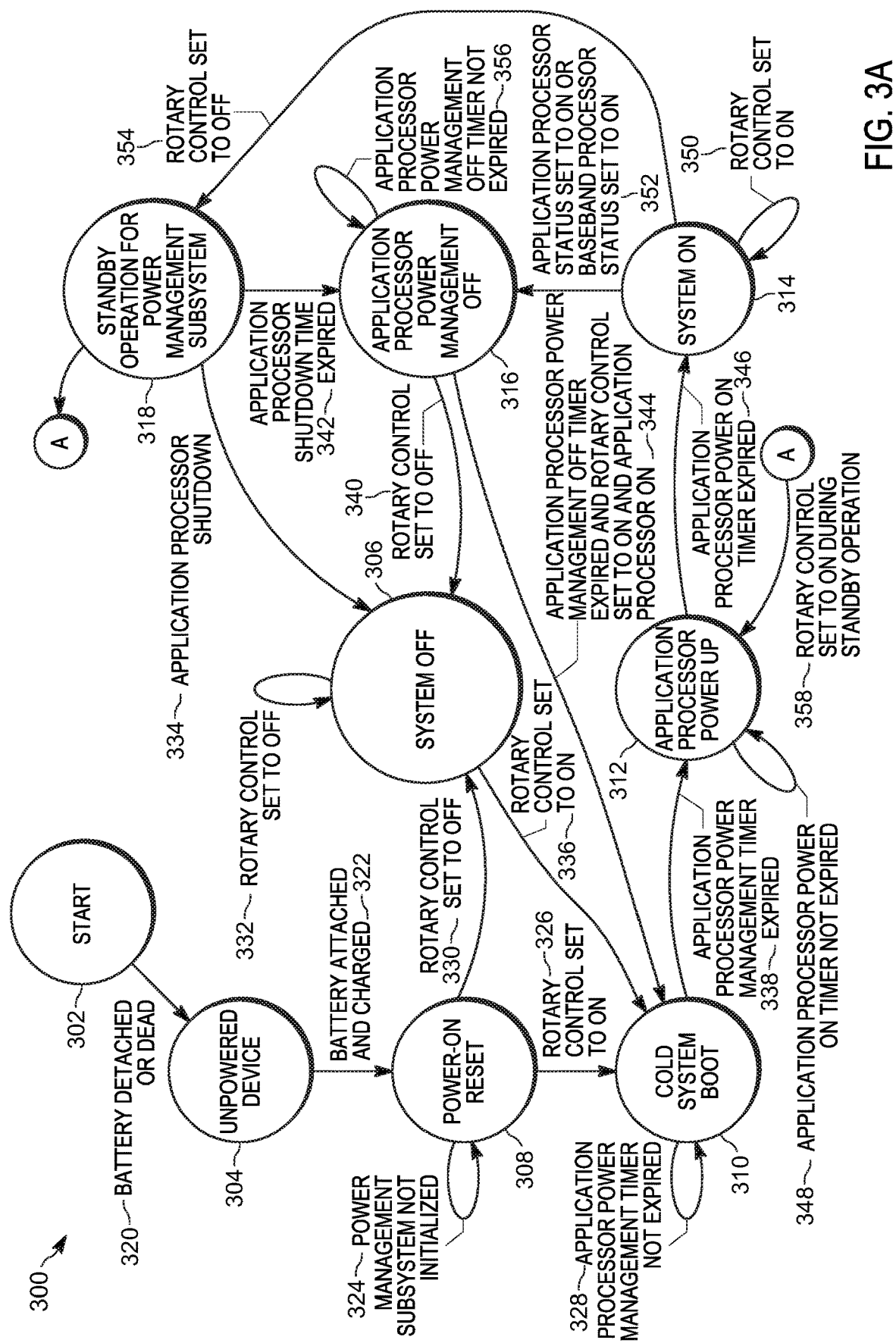
FIG. 3A is a state diagram illustrating entry and exit from mission critical standby, in accordance with some embodiments.

Referring now to FIG. 3A, there is provided a state diagram illustrating entry to and exit from mission critical standby for a portable communication device designed in accordance with some embodiments. While a particular order of states and transitions is indicated in FIG. 3A for illustrative purposes, the timing and ordering may vary where appropriate without negating the purpose and advantages of the examples set forth in detail throughout the remainder of this disclosure. State diagram of portable communication device 300 may start at state 302. In various embodiments, portable communication device 300 may include an energy source, such as a battery. In some embodiments, portable communication device 300 may include a battery that may be removable by the user of portable communication device 300, such as battery 135 as described for FIG. 1. When the battery is detached or dead at 320, portable communication device 300 may transition to unpowered device state 304. For example, a removable battery may be dead when the battery is discharged beyond a minimum threshold necessary to power portable communication device 300. As another example, the removable battery may be detached from portable communication device 300.

When a battery is attached or charged at 322, portable communication device 300 may transition to power-on reset state 308. Portable communication device 300 may power up one or more power supplies in response to the battery being attached or charged at 322. For example, power supply 210 as described for FIG. 2 may power up one or more power supplies, such as subsystem power supply 234. In some embodiments, the battery may not be removable by the user of portable communication device 300. The battery or portable communication device 300 may be charged beyond the minimum threshold necessary to power portable communication device 300. For example, battery 135 may be charged via terminals 140 as described for FIG. 1. In some embodiments, the battery may be removable from portable communication device 300. The removable battery may be charged as described herein to provide power to portable communication device 300 or may be removed from portable communication device 300 and replaced with another removable battery with a charge above the minimum threshold necessary to power. Skilled artisans will appreciate that in some embodiments other energy sources may be used to power portable communication device 300.

Portable communication device 300 may remain in power-on reset state 308 while the power management subsystem is not initialized at 324. The power management subsystem, also referred to as the power state manager, may sequence the supply of power to the baseband processor (BP) and the application processor (AP). For example, power management subsystem 216 as described for FIG. 2 may be initialized while portable communication device 300 is in power-on reset state 308. Portable communication device 300 may transition from power-on reset state 308 once the power management subsystem has completed initialization.

Transition from power-on reset state 308 may be based on the state of the rotary control of portable communication device 300. When rotary control is set to off at 330, portable communication device 300 may transition to system-off state 306. In some embodiments, the rotary control may be implemented as rotary control 212 as described for FIG. 2. Although a rotary control is described, it will be appreciated that in some embodiments other types of input devices may be used to indicate the state of the radio associated with portable communication device 300. When the rotary control is set to off at 330, the power management subsystem may set one or more status signals to indicate that the system is powered off and may reset one or more timers corresponding to the application processor (AP). For example, power management subsystem 216 as described for FIG. 2 may set main system status 230 to powered off, set application processor (AP) power enable 236 to powered off, set application processor (AP) status 238 to powered off, and reset the application processor (AP) standby timer.

When portable communication device 300 is in power-on reset state 308 and the rotary control is set to on at 326, the power management subsystem may set one or more status signals to indicate that the system is powered on and power communication device 300 may transition to cold system boot state 310. For example, power management subsystem 216 as described for FIG. 2 may set main system status 230 to powered on and AP power enable 236 to powered on. A baseband processor (BP) of portable communication device 300 may be powered on when the rotary control is set to on and the power management subsystem may determine whether the BP is in a powered off state based on the setting of the rotary control and may set the status signals.

The BP may be able to process data associated with mission critical communications within a few seconds of the rotary control being set to on. When portable communication device 300 transitions to cold system boot state 310, the power management subsystem may sequence the supply of power to the AP. For example, power management subsystem 216 as described for FIG. 2 may indicate assert AP power enable 236 to power supply 210, which may power on battery power supply 240 to supply power to AP 204 via AP PMIC 208. To support mission critical communications, the BP may operate a real-time operating system (RTOS), which may process communications without indeterminant delays. For example, the RTOS may enable the BP to receive or transmit communications within a defined period of time or within a defined amount of jitter corresponding to any delay of the communication being received or transmitted. The AP of portable communication device 300 may be able to process data associated with communications many seconds after being powered on. The BP may power on and booting more quickly than the AP. In at least some embodiments, the time required by the AP to power on and boot may be an order of magnitude longer than the time required by the BP.

An application processor power management timer (AP PM timer) may be used to delay the power up of the application processor (AP) until after the baseband processor (BP) has powered up. The AP PM timer may be tuned to isolate the surge in load associated with power up of the AP from the surge in load associated with the power up of the BP. When an application processor power management timer (AP PM timer) is not expired at 328, portable communication device 300 may remain in cold system boot state 310 and the power management subsystem of portable communication device 300 may set the AP status, such as AP status 238 as described for FIG. 2, to indicate that the AP is powered off. In various embodiments, the AP PM timer may expire after a defined period. Expiration of the AP PM timer may be determined using any suitable technique, including but not limited to, comparing a counter to a threshold to determine expiration of the AP PM timer based on whether the counter exceeds the threshold. When the AP PM timer expires at 338, the power management subsystem may start an application processor (AP) power-on timer, and portable communication device 300 may transition to application processor (AP) power-up state 312. When the AP power-on timer has not expired at 348, portable communication device 300 may remain in AP power-up state 312 and the power management subsystem may continue to set the AP status to indicate that the AP is powered off. Although the AP is shown powering up after the BP powers up, the AP power up 312 may start before the BP startup is complete. In some embodiments the BP and AP may boot, reboot, or restart in parallel. For example, the BP and AP may be implemented as BP 202 and AP 204 as described for FIG. 2, which may restart in parallel.

When the AP power-on timer expires at 346, portable communication device 300 may transition to system-on state 314 and the power management subsystem may set the AP status to indicate that the AP is powered on. Portable communication device 300 may remain in system-on state 314 while the rotary control is set to on at 350. When portable communication device 300 is in the system-on state 314 and the rotary control is set to off at 354, portable communication device 300 may transition to state 318 for standby operation for the power management subsystem and the power management subsystem may start a plurality of timers. The plurality of timers may include an application processor (AP) standby timer, application processor (AP) cleanup timer, and application processor (AP) watchdog timer.

When portable communication device 300 is in the state 318 for standby operation for the power management subsystem and the rotary control is set to on at 358, portable communication device 300 may transition to AP power-up state 312. When portable communication device 300 is in state 318 for standby operation for the power management subsystem and the application processor shutdown signal is asserted at 334, portable communication device 300 may transition to system-off state 306 and the power management subsystem may set one or more status signals to indicate that the system is powered off and may reset one or more timers corresponding to the application processor (AP). For example, power management subsystem 216 as described for FIG. 2 may set main system status 230 to powered off, set application processor (AP) power enable 236 to powered off, set application processor (AP) status 238 to powered off, and reset the application processor (AP) standby timer. When portable communication device 300 is in state 318 for standby operation for the power management subsystem and the application processor (AP) shutdown timer 342 expires, portable communication device 300 may transition to AP PM off state 316.

When portable communication device 300 is in the system-on state 314 and the AP status indicates that the AP is turned on or the baseband processor status (BP status) indicates that the BP is turned on at 352, the BP may operate to supervise operation of the AP. For example, BP 202 as described for FIG. 2 may supervise AP 204 over input/output and busses 250 and 254 through isolation buffer 214. In some embodiments, supervision by the BP may indicate that the AP is not operating as expected. For example, supervision over input/output and busses 250 may indicate that the AP is in a standby state or turned off when the AP is expected to be turned on or that the AP is turned on when the AP is expected to be in a standby state or turned off. As another example, supervision over input/output and busses 250 may indicate that the AP locked up or has failed to respond. When the AP is not operating as expected, portable communication device 300 may transition to the application processor power management (AP PM) off state 316 and power management subsystem may start an application processor (AP) power management (PM) off timer and set a plurality of indicators. The plurality of indicators may include setting the AP power enable to indicate that the AP is powered off, setting an application processor (AP) wake to indicate that the AP is in a non-active state and setting the AP status to indicate that the AP is powered down. Portable communication device 300 may remain in AP PM off state 316 while the AP PM Off timer has not expired at 356.

When portable communication device 300 is in the AP PM off state 316 and the rotary control is set to off at 340, portable communication device 300 may transition to system-off state 306. When portable communication device 300 is in the AP PM off state 316 and a plurality of conditions is satisfied at 344, portable communication device 300 may transition to cold system boot state 310, and the power management subsystem may set the AP power enable to indicate that the AP is powered on and may start the AP PM timer. The plurality of conditions may include the AP PM off timer has expired, the rotary control is set to on, and the AP status indicates that the AP is turned on. When portable communication device 300 is in the system-off state 306 and the rotary control is set to off at 332, portable communication device 300 may remain in the system-off state 306. When the rotary control is set to on at 336, portable communication device 300 may transition to cold system boot state 310.

Figure 3B:
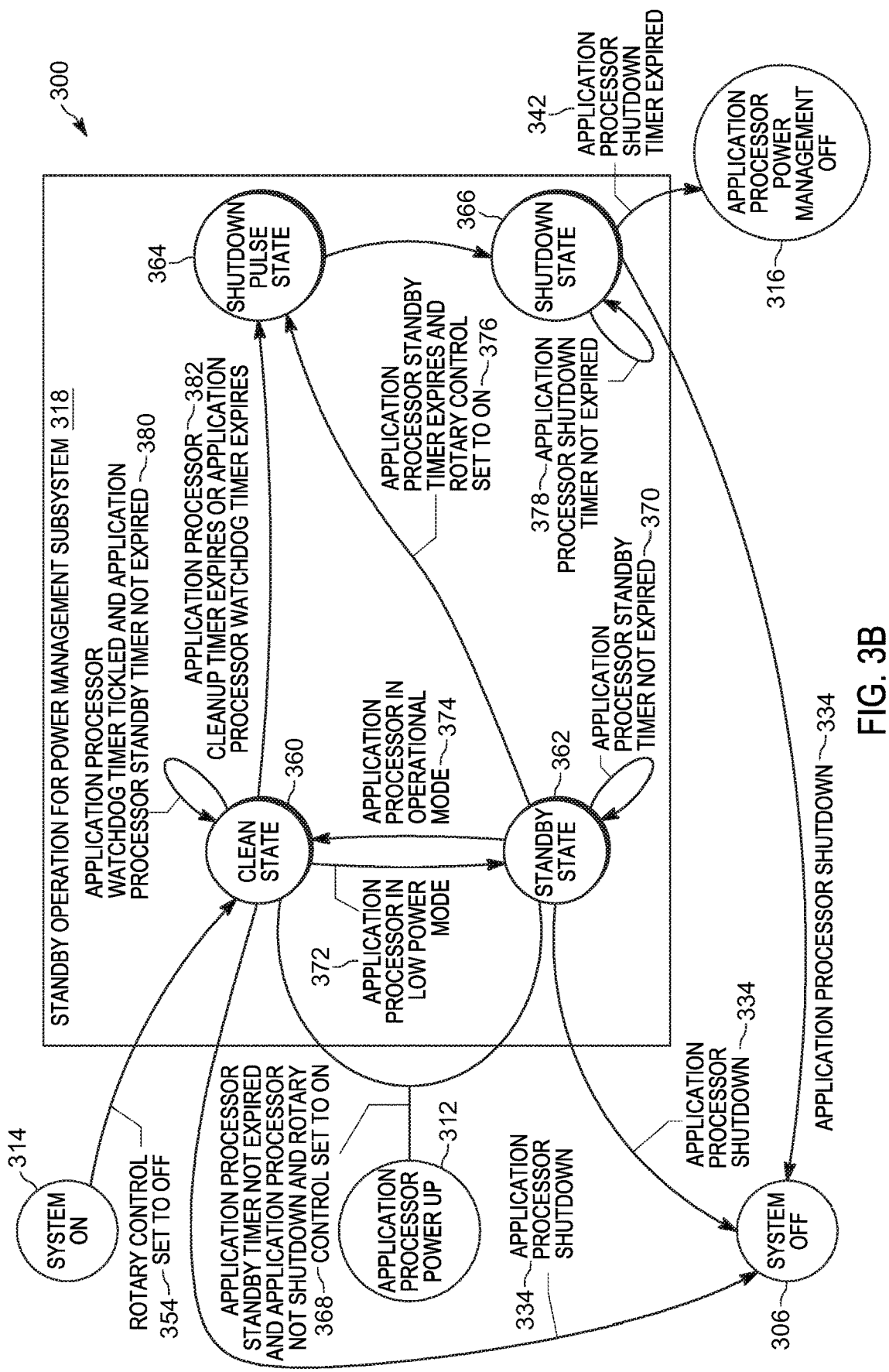
FIG. 3B is a state diagram illustrating mission critical standby, in accordance with some embodiments.

Referring now to FIG. 3B, there is provided a state diagram illustrating mission critical standby for a portable communication device designed in accordance with some embodiments. Although a particular order of states and transitions is indicated in FIG. 3B for illustrative purposes, the timing and ordering may vary where appropriate without negating the purpose and advantages of the examples set forth in detail throughout the remainder of this disclosure. In FIG. 3B, the state 318 for standby operation for power management subsystem is shown as four states, including cleanup state 360, standby state 362, shutdown pulse state 364, and shutdown state 366. Although four states are illustrated, state 318 for standby operation for power management subsystem may include one or more states in various embodiments. For example, in some embodiments the standby operation may include three states in which shutdown pulse state 364 and shutdown state 366 may be combined to form a common shutdown state that represents both the shutdown pulse and the shutdown timer expiration. The power management subsystem, also referred to as the power state manager, may sequence the supply of power to the baseband processor (BP) and the application processor (AP) and may monitor the AP when the BP is powered off to support mission critical standby. In some embodiments, the power management subsystem may permit cleanup operation on AP by supervising unexpected wakeup events by the AP and by returning the AP to standby or forcing the AP to shut down.

When portable communication device 300 is in the system-on state 314, the baseband processor (BP) may be powered on and may monitor the application processor (AP) to determine the power state of the AP. In some embodiments, the power state of the BP may be controlled by a rotary control of portable communication device 300. When the rotary control is set to off at 354, the BP may power down, portable communication device 300 may transition to cleanup state 360, and the power management subsystem may start a plurality of timers, including but not limited to, an application processor (AP) standby timer, application processor (AP) cleanup timer, and application processor (AP) watchdog timer.

Cleanup state 360 may provide the AP time to cleanup processing operations before entering the standby. In some embodiments, the time to cleanup may be bounded by the power management subsystem to limit the maximum amount of time for cleanup operations. Cleanup operations by the AP may include one or more activities, including but not limited to, writes to clear flash memory coupled to the AP, application of a security patch, and processing of a long-term evolution (LTE) request. While the application processor (AP) watchdog timer has been tickled and the application processor (AP) standby timer has not expired at 380, portable communication device 300 may remain in cleanup state 360 and the power management subsystem may reset the AP watchdog timer. For example, the watchdog timer of AP 204 as described for FIG. 2 may be tickled by power management subsystem 216 via AP tickle 246 when power management subsystem 216 determines that AP 204 remains in an active state. When the AP cleanup timer expires or the AP watchdog timer expires at 382, portable communication device 300 may transition to shutdown pulse state 364, and power management subsystem may start an application processor (AP) power off timer. In some embodiments, the power management subsystem may force the AP to shut down by setting the AP status to indicate the AP is powered off and setting the rotary status for the AP, such as rotary status 248 as described for FIG. 2, to indicate to the AP that the radio is switched on.

When portable communication device 300 is in cleanup state 360 and an application processor (AP) voltage signal, such as application processor (AP) power status 232 as described for FIG. 2, indicates that the application processor (AP) is in a non-operational low-power mode at 372, portable communication device 300 may transition to standby state 362 and the power management subsystem may stop the AP cleanup timer and the AP watchdog timer. The AP may be inactive while the system is in standby state 362. For example, the AP may be in a standby state that reduces the power consumed by the AP. Portable communication device 300 may remain in standby state 362 while the application processor (AP) standby timer has not expired at 370. In some embodiments, the AP standby timer may be set by a user of portable communication device 300. The AP may wake from standby state 362 based on the operating platform executing on AP not being able to force the AP to remain in standby. In some embodiments, the AP may fast wake from standby state 362 to process cleanup operations in cleanup state 360 before returning to standby state 362.

When the AP voltage signal returns to operational mode at 374, portable communication device 300 may transition from standby state 362 to cleanup state 360 and the power management subsystem may resume the AP cleanup timer and AP watchdog timer. The power management subsystem may resume the AP cleanup timer and AP watchdog timer without resetting the timers. When portable communication device 300 is in cleanup state 360 or standby state 362, portable communication device 300 may transition to application processor (AP) power-up state 312 when a plurality of conditions is satisfied. The plurality of conditions may include the application processor (AP) standby timer not expiring, the application processor (AP) shutdown not being asserted, and the rotary control being set to on at 368. When the plurality of conditions is satisfied, the power management subsystem may set the AP status to indicate that the AP has turned off, may stop the AP standby timer, and may start the AP power-on timer.

When portable communication device 300 is in standby state 362, and the rotary control is set to on and the AP standby timer expires at 376, the portable communication device may transition to shutdown pulse state 364 and the power management subsystem may set the AP status to indicate the AP is powered off and may start the AP power off timer. While portable communication device 300 is in the shutdown pulse state 364, the power management subsystem may provide a pulse to the AP to initiate shutdown of the AP. The portable communication device may transition to shutdown state 366 after the shutdown pulse is provided. Skilled artisans will appreciate that the power management subsystem may provide a long pulse to the AP to force the shutdown of the AP. The portable communication device may remain in shutdown state 366 while the application processor (AP) shutdown timer has not expired at 378.

When portable communication device 300 is in cleanup state 360, shutdown state 366 or standby state 362, and application processor shutdown is asserted at 334, the portable communication device may transition to system-off state 306. The transition 334 to system-off state 306 may include a hard shutdown to force the AP to shut down and power off. During transition 334, power management subsystem may set one or more status signals to indicate that the system is powered off and may reset one or more timers corresponding to the application processor (AP). For example, power management subsystem 216 as described for FIG. 2 may set main system status 230 to powered off, set application processor (AP) power enable 236 to powered off, set application processor (AP) status 238 to powered off, and reset the application processor (AP) standby timer. Otherwise, when the AP shutdown timer expires at 342, portable communication device 300 may transition out of the standby operation for power management subsystem to AP PM off state 316 and power management subsystem may set the AP power enable to indicate that the AP is not powered on.

Figure 4A:
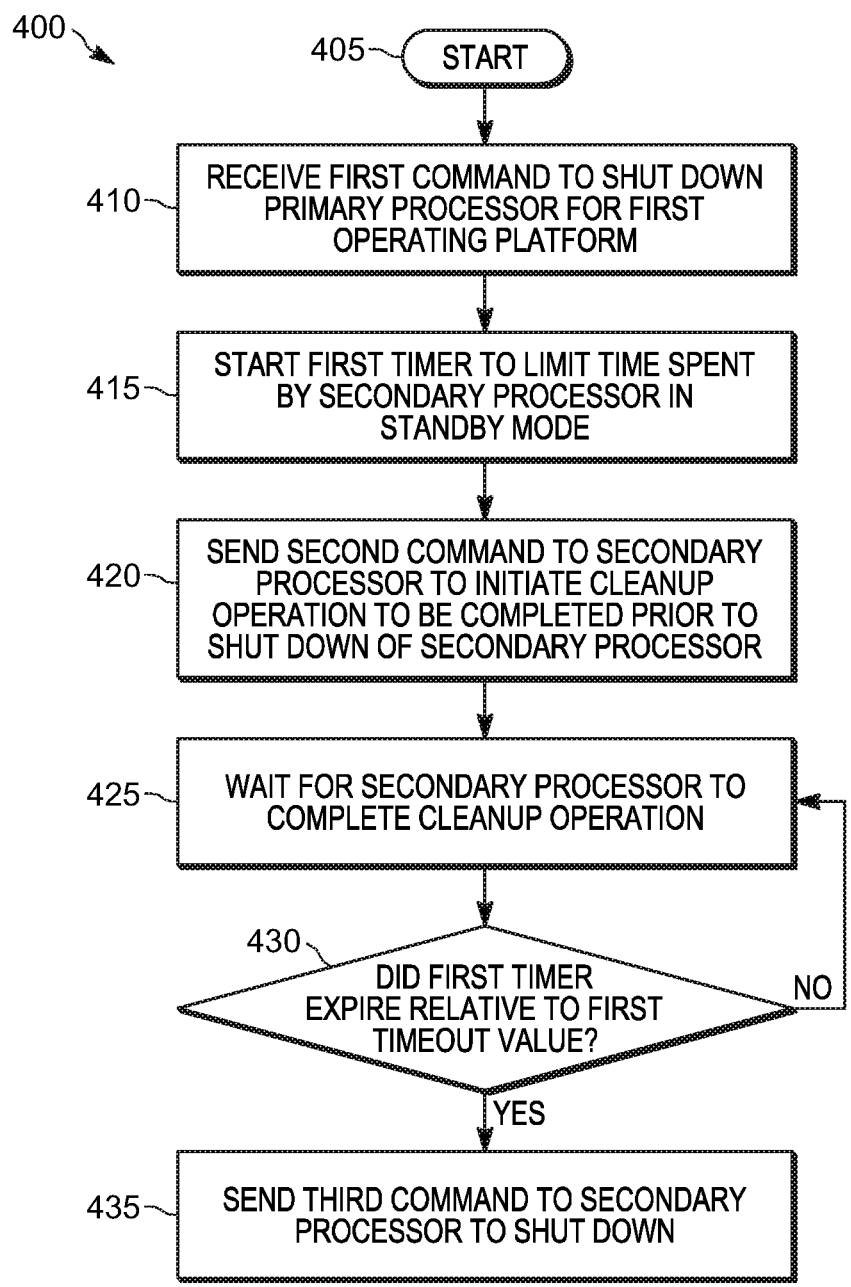
FIG. 4A is a flowchart illustrating a method for mission critical standby on a portable communication device, in accordance with some embodiments.

Referring now to FIG. 4A, there is provided a flow diagram of an example method 400 for mission critical standby on a portable communication device shown in accordance with some embodiments. While a particular order of operations is indicated in FIG. 4A for illustrative purposes, the timing and ordering of such operations may vary where appropriate without negating the purpose and advantages of the examples set forth in detail throughout the remainder of this disclosure. In some embodiments, one or more portions of method 400 may be executed at some predetermined periodic time period thereafter, in response to a trigger raised locally in the portable communication device. For example, the trigger may be raised in response to the need to support mission critical standby when the primary processor is shut down.

In this example embodiment, method 400 begins with block 405 in FIG. 4A and continues to block 410, where a first command is received to shut down the primary processor for a first operating platform. The first command may correspond to input to change the state of the radio supported by the primary processor. For example, the first command may correspond to the rotation of rotary control 212 as described in FIG. 2 or the knob 110 as described in FIG. 1. In some embodiments, the first command may be received by a power management subsystem, also referred to as a power state manager, which may sequence the supply of power to the primary processor and a secondary processor of the portable communication device. For example, power management subsystem 216 as described for FIG. 2 may receive the first command to shutdown BP 202 from rotary control 212 via rotary control status 220. In some embodiments, power management subsystem may shutdown the primary processor. For example, power management subsystem 216 as described for FIG. 2 may provide rotary status 224 to BP PMIC 206, which in response may power down BP 202 via BP power supply 227.

At block 415, a first timer may be started to limit time spent by a secondary processor of the portable communication device in standby mode. The first timer may be started in response to the receipt of the first command. For example, as described for transition 354 in FIGS. 3A and 3B, the AP standby timer may be started when the portable communication device is in the system-on state 314 and the rotary control is set to off. The secondary processor may be an application processor, such as AP 204 as described for FIG. 2. The secondary processor may support low-power modes and may shut down when not active. The secondary processor may be monitored by the primary processor when the primary processor is powered on or by a power management subsystem when the primary processor is powered off.

At block 420, a second command may be sent to the secondary processor to initiate cleanup operation on the secondary processor. The cleanup operation may be completed prior to the shut down of secondary processor and may include any suitable operation appropriate for operation between normal active operation and a low-power state, including but not limited to, writing to clear flash memory, applying a system updated, or responding to a long-term evolution (LTE) request. For example, as described for transition 354 in FIG. 3B, when the portable communication device is in the system-on state 314 and the rotary control is set to off, one or more timers may be started to initiate cleanup operation by sending a command, including but not limited to, the AP standby timer, AP cleanup timer, and AP watchdog timer. As another example, a command may be sent to initiate cleanup operation during transition 380 as described for FIG. 3B such that the AP watchdog timer is tickled.

At block 425, method 400 may wait for the secondary processor complete cleanup operation. At block 430, it may be determined whether the first timer expired relative to a first timeout value. In some embodiments, the first timeout value may be set by a user of the portable communication device. When the first timer expires, method 400 may proceed to block 435. Otherwise, method 400 may return to block 425. At block 435, a third command may be sent to the secondary processor to shut down. The third command may be sent in response to a determination that the first timer expired. For example, a command may be sent to shut down the AP during transition 376 as described for FIG. 3B. The command may set the AP status, such as AP status 238 as described for FIG. 2, to indicate that the AP is being shut down. As another example, the command may be sent to shut down the AP during transition 334 in FIG. 3B. The command may set AP shutdown, such as AP shutdown 242 as described for FIG. 2, to force the AP to shut down. When the AP fails to respond to the setting of AP shutdown, such as AP shutdown 242 as described for FIG. 2, and the AP does not enter a shutdown state, such as shutdown state 366 as described or FIG. 3B, the power management subsystem may force the AP PMIC, such as AP PMIC 208 as described for FIG. 2, to turn off the supply of power to the AP by re-asserting AP shutdown for an extended period of time.

Figure 4B:
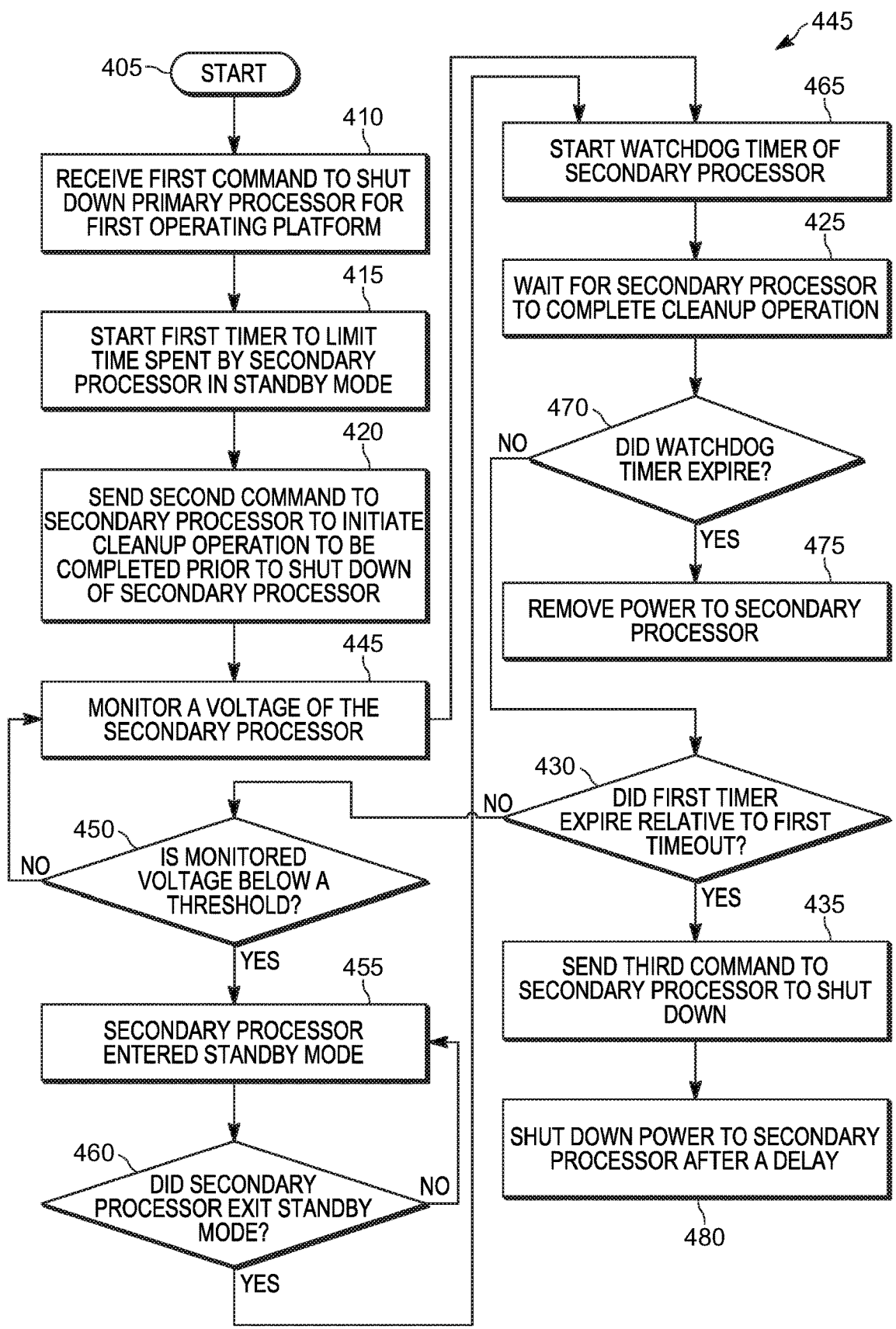
FIG. 4B is a flowchart illustrating a method for mission critical standby and cleanup operation on a portable communication device, in accordance with some embodiments.

Referring now to FIG. 4B, there is provided a flow diagram of example method 440 for mission critical standby and cleanup operation on a portable communication device shown in accordance with some embodiments. While a particular order of operations is indicated in FIG. 4B for illustrative purposes, the timing and ordering of such operations may vary where appropriate without negating the purpose and advantages of the examples set forth in detail throughout the remainder of this disclosure. In some embodiments, one or more portions of method 440 may be executed at some predetermined periodic time period thereafter, in response to a trigger raised locally in the portable communication device. For example, the trigger may be raised in response to the need to support mission critical standby when the primary processor is shut down.

In this example embodiment, method 440 begins with block 405 in FIG. 4A and continues to block 410, where a first command to shut down the primary processor is received. At block 415, a timer to limit time spent by the secondary processor in a standby mode is started. At block 420, a second command is sent to the secondary processor to initiate cleanup operation. Blocks 410, 415, and 420 of method 440 may operate as described for method 400 in FIG. 4A. At block 445, a voltage of the secondary processor may be monitored. The voltage may be any voltage supply to the secondary processor that is indicative of the activity on the secondary processor. For example, the voltage of the secondary processor, such as the secondary processor core voltage, may indicate whether the secondary processor is in a standby state. The memory associated with the secondary processor may enter a self-refresh mode of operation, which may reduce the voltage of the memory to save power and may maintain the data in the memory without sending or receiving data from the secondary processor. When the primary processor is powered on, the primary processor may monitor the voltage and when the primary processor is powered off, a power management subsystem may monitor the voltage. For example, power management subsystem 216 as described for FIG. 2 may monitor the voltage via application processor (AP) power status 232. Based on the monitoring, an application processor (AP) may transition between cleanup state 360 and standby state 362 as described for FIG. 3B.

At block 465, a watchdog timer of the secondary processor may be started. A watchdog timer may indicate whether the secondary processor has locked up to reset or shutdown the secondary processor. In some embodiments, the watchdog timer may be used to limit the duration that the secondary processor remains in a cleanup mode. The watchdog timer may be tickled periodically when activity is detected on the secondary processor. For example, power management subsystem 216 as described for FIG. 2 may tickle the watchdog timer via application processor tickle 246. At 425, method 440 may wait for the secondary processor to cleanup, as described for method 400 in FIG. 4A. At 470, it may be determined whether the watchdog timer of the secondary processor expired. In some embodiments, the watchdog timer may expire when the counter corresponding to the watchdog timer reaches a value of zero after the counter is reset to a specific value when the watchdog timer is tickled. Skilled artisans will appreciate that in some embodiments the counter of the watchdog timer may reset to a value of zero and increment such that the counter may exceed a threshold. When the watchdog timer expires, method 440 may proceed to block 475. At block 475, power to the secondary processor may be removed in response to the expiration of the watchdog timer. It may be determined that the secondary processor has locked up or has failed to respond when the watchdog timer expires. In response, method 400 may remove power to the secondary processor to reset or shutdown the secondary processor.

When the watchdog timer does not expire, method 440 may proceed to block 430, where it may be determined whether a first timer to limit time spent by the secondary processor in standby mode expired relative to a first timeout, as described for method 400 in FIG. 4A. When the first timer expires, method 440 may proceed to block 435, where a third command is sent to the secondary processor to shut down, as described for method 400 in FIG. 4A. At block 480, power to the secondary processor may be shut down after a delay when the secondary processor does not respond to the third command. For example, when AP 204 as described for FIG. 2 does not respond, AP PMIC 208 may turn off the supply of power to AP 204 by power management subsystem 216 re-asserting AP shutdown 242 for an extended period. After the extended period, AP 204 may be forced to shut down when AP power supply 229 no longer supplies power to AP 204.

When the first timer does not expire, method 440 may proceed to block 450, where it may be determined whether the monitored voltage is below a threshold. In some embodiments, the monitored voltage may be compared to a threshold associated with normal operation. Skilled artisans will appreciate that in some embodiments, the power supply of a portable communication device may perform the comparison and provide a status indication to the power management subsystem. When the monitored voltage is below the threshold, method 440 may proceed to block 455. Otherwise, the method may return to block 445 to continue monitoring the voltage. At block 455, it is determined that the secondary processor entered standby based on the determination that the monitored voltage is below the threshold.

At block 460 it may be determined whether the secondary processor exited standby mode after initially entering standby mode. The determination of whether the secondary processor exited standby mode may be determined based on one or more indications of the state of the secondary processor. The indications may include, but not limited to, monitoring the state via the power management integrated circuit for the secondary processor, monitoring the state of a clock generator for the secondary processor, monitoring a timer or waiting on an interrupt corresponding to activity on the secondary processor, and monitoring a voltage of the secondary processor that may increase above a threshold when the secondary processor is active. When the secondary processor exits standby mode, method 440 may proceed to block 465. Otherwise the method may proceed to block 455.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the system, method, or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of any single disclosed embodiment. Thus the following claims are hereby incorporated into the Detailed Description, with each claim standing on its own as a separately claimed subject matter.

We claim:

1. A portable communication device, comprising:
   a primary processor for a first operating platform;
   a secondary processor for a second operating platform, the secondary processor communicatively coupled to the primary processor; and
   a power state manager, the power state manager configured to:
      determine whether the primary processor is in a powered off state;
      determine a power state of the secondary processor by monitoring a core power supply voltage of the secondary processor; and
      sequence supply of power to the secondary processor sequenced between:
         a first state for cleanup operation of the secondary processor;
         a second state for standby of the secondary processor, wherein state information of the secondary processor is maintained;
         a third state for shutdown of the secondary processor;
      wherein:
         the power state manager includes:
            a first mode, the first mode to allow the primary processor to monitor a power state of the secondary processor based on a determination that the primary processor is not in the powered off state; and
            a second mode, the second mode to enable the power state manager to monitor the power state of the secondary processor based on a determination that the primary processor is in the powered off state.

2. The portable communication device of claim 1, further comprising:
   a rotary knob to select between the first mode and the second mode of the power state manager.

3. The portable communication device of claim 1, wherein the primary processor and secondary processor are restarted in parallel when the power state manager enters the first mode.

4. The portable communication device of claim 1, wherein the first operating platform is a real-time operating system for high-powered audio communications and the second operating platform is a mobile operating system for broadband applications.

5. The portable communication device of claim 1, further comprising:
   a battery configured to supply power to the primary processor and the secondary processor.

6. The portable communication device of claim 1, wherein the power state manager is configured to:
   sequence from the second mode to the first mode by using a fast wake up of the secondary processor.

7. The portable communication device of claim 1, wherein the power state manager is configured to sequence the secondary processor from the second state for the standby of the secondary processor to the third state for shutdown of the secondary processor in response to expiration of a timer for suspended operation of the secondary processor.

8. The portable communication device of claim 4, wherein the high-powered audio communications include land mobile radio communications and the mobile operating system is Android.

9. The portable communication device of claim 1, wherein:
   the power state manager is configured to determine the power state of the secondary processor is the first state based on the voltage of the secondary processor being above a threshold; and
   the power state manager is configured to sequence the secondary processor from the first state to the third state in response to expiration of a watchdog timer, the watchdog timer being reset during the cleanup operation of the secondary processor.

10. The portable communication device of claim 6, wherein the power state manager is configured to reset a standby timer for the secondary processor independent of a configuration of the secondary processor to sequence between the second state for the standby of the secondary processor to the first state for the cleanup operation of the secondary processor.

11. A portable communication device, comprising
   a primary processor for a first operating platform;
   a secondary processor for a second operating platform, the secondary processor: communicatively coupled to the primary processor; and
   a power state manager, the power state manager configured to:
      determine whether the primary processor is in a powered off state;
      determine a power state of the secondary processor by monitoring a state of a clock generator of the secondary processor; and
      sequence supply of power to the secondary processor sequenced between:
         a first state for cleanup operation of the secondary processor;
         a second state for standby of the secondary processor, wherein state information of the secondary processor is maintained;
         a third state for shutdown of the secondary processor;
      wherein:
         the power state manager includes:
            a first mode, the first mode to allow the primary processor to monitor the power state of the secondary processor based on a determination that the primary processor is not in the powered off state; and
            a second mode, the second mode to enable the power state manager to monitor the power state of the secondary processor based on a determination that the primary processor is in the powered off state.

12. A portable communication device, comprising
   a primary processor for a first operating platform;
   a secondary processor for a second operating platform, the secondary processor: communicatively coupled to the primary processor; and
   a power state manager, the power state manager configured to:
      determine whether the primary processor is in a powered off state;
      determine a power state of the secondary processor; and
      sequence supply of power to the secondary processor sequenced between:
         a first state for cleanup operation of the secondary processor;

a second state for standby of the secondary processor, wherein state information of the secondary processor is maintained;

a third state for shutdown of the secondary processor;

wherein:

the power state manager includes:

a first mode, the first mode to allow the primary processor to monitor the power state of the secondary processor based on a determination that the primary processor is not in the powered off state;

a second mode, the second mode to enable the power state manager to monitor the power state of the secondary processor based on a determination that the primary processor is in the powered off state;

the power state manager is configured to determine the power state of the secondary processor is in the first state based on the voltage of the secondary professor being above a threshold; and the power state manager is configured to sequence the secondary processor from the first state to the third state in response to expiration of a watchdog timer, the watchdog timer being reset during the cleanup operation of the secondary processor.

* * * * *